Figure 1:
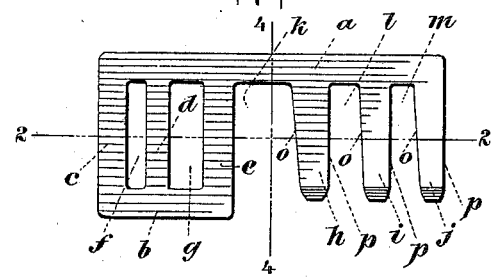
Figure 2:
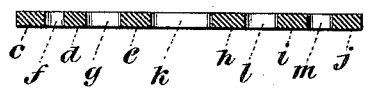
Figure 3:
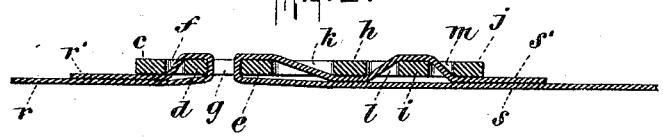
Figure 4:
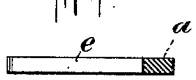
Figure 5:
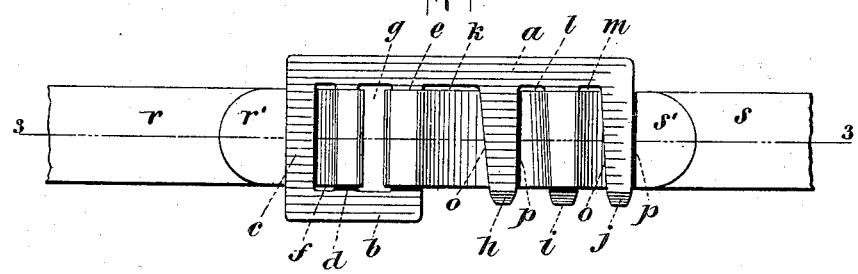

No. 701,259. Patented May 27, 1902.
H. DE HAVEN.
BALE TIE.
(Application filed Dec. 2, 1901.)
(No Model.)

WITNESSES:
Gustave Dieterich
John Stehlenbeck

INVENTOR
Hugh De Haven
BY
ATTORNEYS

UNITED STATES PATENT OFFICE.

HUGH DE HAVEN, OF BROOKLYN, NEW YORK.

BALE-TIE.

SPECIFICATION forming part of Letters Patent No. 701,259, dated May 27, 1902.

Application filed December 2, 1901. Serial No. 84,356. (No model.)

*To all whom it may concern:*

Be it known that I, HUGH DE HAVEN, a citizen of the United States, and a resident of the borough of Brooklyn, county of Kings, city and State of New York, have invented certain new and useful Improvements in Bale-Ties, of which the following is a specification.

My invention relates to bale-ties, and has for its object to produce a bale-tie which will securely fasten the bands with which bales are usually bound and which is especially adapted to hold cheap soft-metal stock.

In the accompanying drawings I have shown by way of illustration a bale-tie embodying my invention.

In the drawings, Figure I is a plan or face view of the bale-tie. Fig. II is a longitudinal section on line 2 2 of Fig. I. Fig. III is an edge view of the bale-tie, showing the strap in place. Fig. IV is a section on line 4 4 of Fig. I, and Fig. V is a plan view of the tie shown in Fig. III.

As before stated, the bale-tie shown is especially designed for use with a soft-metal strap. This soft-metal strap may be coiled upon reels in any desired length and short sections thereof may be cut off and only so much as is needed used on each occasion.

In the drawings, $a$ indicates the back bar of my improved bale-tie, and $b$ the front bar thereof. The front and back bars are shown as connected by side bars $c$ $d$ $e$, forming with the front and back bars a double loop. One of the openings $f$—to wit, the one nearest the end of the bale-tie—is shown as smaller than the other opening $g$. This opening $g$ is preferably made larger, for the reason that both ends of the strap are designed to be passed therethrough.

Projecting from the back bar $a$ are a series of fingers $h$ $i$ $j$, leaving between the said fingers slots or openings $k$ $l$ $m$, whereof the slot or opening $k$ is preferably wider than the other slots or openings $l$ $m$. The working or front edges $o$ of the fingers are preferably inclined with respect to the axial line 2 2 of the bale-tie in order to permit the ready insertion of the strap between the fingers and the rear edges $p$ thereof preferably run at right angles thereto in order to bring about a strong engagement with the strap. It will also be observed that the fingers are pointed or beveled, preferably, on all four sides in order to further facilitate the introduction of the strap between the same.

The mode of using the bale-tie is as follows: The proper length of strap is severed from the reel of strapping and passed around the bale, the free or severed ends $r$ $s$ thereof being introduced into the bale-tie, as clearly shown in Figs. III and V. The severed end $r$ passes upward through the opening $g$, thence over the bar $d$, beneath the bar $c$, where the extreme end $r'$ of the strap is firmly gripped between the bar $c$ and the body of the end $r$ of the strap. The other end of the strap $s$ passes upward through the opening $g$, thence over the bar $e$, through the opening $k$, under the finger $h$, over the finger $i$, and under the finger $j$, where its extreme end $s'$ will be gripped between the body of the end $s$ and the bar $j$. The construction thus accomplishes a very secure fastening of the bale-tie. It will also be observed that the construction is a very cheap and simple one, which can readily be economically manufactured in either large or small quantities.

Having described my invention, what I claim, and desire to secure by Letters Patent, is—

1. A bale-tie provided with a back bar and a double loop at one end adapted to receive the ends of a strap, one end of the said strap being anchored by engagement with both of the loops and a series of fingers projecting from the said back bar and adapted to engage and retain a strap passing through one of the loops, and having its free end interwoven with the fingers.

2. In a bale-tie the combination of a back bar and a plurality of loops at or near one end, the said loops being separated by a crossbar, one of the said loops being larger than the other and adapted to receive both of the free ends of the strap, the other of said loops being adapted to coöperate with its mate to firmly anchor one of the free ends of the strap, and a series of fingers adapted to coöperate with the larger loop to hold the other free end of the strap.

3. In a bale-tie, the combination of means for anchoring one end of the bale-tie combined with means for anchoring the other end thereof, the said last-mentioned means comprising a series of fingers, each finger having a front edge inclined to the axis of the tie and a rear edge at substantially right angles thereto and adapted to engage the strap.

4. In a bale-tie the combination of a back bar having a loop at or near one end and a series of fingers at or near the other end, the said fingers having inclined front edges and rear edges substantially at right angles to the axis of the tie and adapted to engage the strap.

5. A bale-tie embodying in its structure a back bar and a plurality of loops at or near one end and a series of pointed fingers at or near the other end having their front edges inclined with respect to the axis of the bale-tie.

6. The combination of cross-bars $c$, $d$, $e$, a strap passing around the middle cross-bar $d$ and beneath the edge of cross-bar $c$, and fingers $h$, $i$, $j$, the other end of the said strap passing around the cross-bar $e$ and under and over adjacent fingers $h$, $i$, $j$.

HUGH DE HAVEN.

Witnesses:
G. L. COMER, Jr.,
ROBY ROBINSON.